US 12,423,566 B2

(12) United States Patent
Shin et al.

(10) Patent No.: US 12,423,566 B2
(45) Date of Patent: Sep. 23, 2025

(54) SRAM-SHARING FOR RECONFIGURABLE NEURAL PROCESSING UNITS

(71) Applicant: Samsung Electronics Co., Ltd., Suwon-si (KR)

(72) Inventors: Jong Hoon Shin, San Jose, CA (US); Ali Shafiee Ardestani, Santa Clara, CA (US); Joseph H. Hassoun, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1079 days.

(21) Appl. No.: 17/400,094

(22) Filed: Aug. 11, 2021

(65) Prior Publication Data
US 2022/0405557 A1 Dec. 22, 2022

Related U.S. Application Data

(60) Provisional application No. 63/209,388, filed on Jun. 10, 2021.

(51) Int. Cl.
*G06N 3/063* (2023.01)
(52) U.S. Cl.
CPC .................... *G06N 3/063* (2013.01)
(58) Field of Classification Search
CPC ............ G06F 16/904; G06F 16/90335; G06F 3/04845; G06F 7/57; G06F 7/5443; G06F 17/16; G06N 3/063
See application file for complete search history.

(56) References Cited

U.S. PATENT DOCUMENTS

| | | | |
|---|---|---|---|
| 10,305,799 B2 | 5/2019 | Dharmapurikar et al. | |
| 10,417,555 B2 | 9/2019 | Brothers et al. | |
| 10,972,103 B2 | 4/2021 | Wang | |
| 11,501,145 B1* | 11/2022 | Huynh | G06N 3/02 |
| 11,651,283 B1* | 5/2023 | Liu | G06N 3/0464 |
| | | | 706/12 |
| 12,008,469 B1* | 6/2024 | Hah | G06N 3/08 |
| 2018/0121196 A1 | 5/2018 | Temam et al. | |
| 2018/0157962 A1* | 6/2018 | Henry | G06N 3/045 |
| 2019/0266479 A1 | 8/2019 | Singh et al. | |

(Continued)

FOREIGN PATENT DOCUMENTS

WO 2021035015 A1 2/2021

OTHER PUBLICATIONS

Alwani, Manoj, et al. "Fused-layer CNN accelerators." 2016 49th Annual IEEE/ACM International Symposium on Microarchitecture (MICRO). IEEE, 2016. (Year: 2016).*

(Continued)

*Primary Examiner* — Andrew T Chiusano
(74) *Attorney, Agent, or Firm* — Renaissance IP Law Group LLP

(57) ABSTRACT

A system and a method is disclosed for processing input feature map (IFM) data of a current layer of a neural network model using an array of reconfigurable neural processing units (NPUs) and storing output feature map (OFM) data of the next layer of the neural network model at a location that does not involve a data transfer between memories of the NPUs according to the subject matter disclosed herein. The reconfigurable NPUs may be used to improve NPU utilization of NPUs of a neural processing system.

17 Claims, 8 Drawing Sheets

(56) References Cited

U.S. PATENT DOCUMENTS

| | | | |
|---|---|---|---|
| 2020/0026980 A1 | 1/2020 | Ovsiannikov et al. | |
| 2020/0159809 A1* | 5/2020 | Catthoor | G06N 3/04 |
| 2020/0293858 A1 | 9/2020 | Das et al. | |
| 2022/0207334 A1* | 6/2022 | Lee | G06N 3/063 |
| 2022/0405558 A1* | 12/2022 | Shin | G06N 3/045 |

OTHER PUBLICATIONS

Chen, Yu-Hsin, et al. "Eyeriss: An energy-efficient reconfigurable accelerator for deep convolutional neural networks." IEEE journal of solid-state circuits 52.1 (2016): 127-138. (Year: 2016).*

Sze, Vivienne, et al. "Efficient processing of deep neural networks: A tutorial and survey." Proceedings of the IEEE 105.12 (2017): 2295-2329. (Year: 2017).*

Wu, Ephrem, et al. "A high-throughput reconfigurable processing array for neural networks." 2017 27th International Conference on Field Programmable Logic and Applications (FPL). IEEE, 2017. (Year: 2017).*

Capra, Maurizio, et al. "Hardware and software optimizations for accelerating deep neural networks: Survey of current trends, challenges, and the road ahead." IEEE Access 8 (2020): 225134-225180. (Year: 2020).*

Xu, Rui, et al. "A Survey of Design and Optimization for Systolic Array-based DNN Accelerators." ACM Computing Surveys 56.1 (2023): 1-37. (Year: 2023).*

Gauchi, Roman et al., "Reconfigurable Tiles of Computing-In-Memory SRAM Architecture for Scalable Vectorization," ISLPED 2020: ACM/IEEE International Symposium on Low Power Electronics and Design, Aug. 2020, pp. 121-126.

European Extended Search Report for Application No. 22167139.9 , mailed Sep. 16, 2022.

* cited by examiner

SRAM-SHARING FOR RECONFIGURABLE
NEURAL PROCESSING UNITS

CROSS-REFERENCE TO RELATED
APPLICATION

This application claims the priority benefit under 35 U.S.C. § 119(e) of U.S. Provisional Application No. 63/209,388, filed on Jun. 10, 2021, the disclosure of which is incorporated herein by reference in its entirety.

TECHNICAL FIELD

The subject matter disclosed herein relates to neural processing units (NPUs). More particularly, the subject matter disclosed herein relates to system and a method for processing input feature map data of a current layer of a neural network model and storing output feature map data of the next layer of the neural network model at a location that does not involve a data transfer between memories of the NPUs.

BACKGROUND

It is difficult to achieve the best utilization of an array of Neural Processing Units (NPUs) with a single configuration. For example, an 8×8 tile configuration of NPUs may be better for modern network using depthwise (i.e., Moble-NetV2), while a 32×32 or a 64×64 tile configuration may be better for a larger network, such as inception V3 and ResNet-50. If the utilization benefit from a reconfiguration is greater than the overhead associated with the reconfiguration, it may be worthwhile to implement a reconfigurable tile architecture.

One of the major bottleneck for reconfigurability may be a cost associated with segmented SRAMs (Static Random Access Memories). Data paths may be shared by multiple cores and saving SRAM capacity may be obtained by using a segmented bus of small SRAMs. One way to implement reconfigurability may be to split a large computational problem into smaller computational problems and run the smaller problems in small NPU cores. However, such an approach may not allow efficient usage of SRAMs, which may be reused in multiplier-and-add units in different cores.

SUMMARY

An example embodiment provides a core of neural processing units that may include an N×N array of NPUs arranged in N rows and N columns in which N is an integer greater than equal to 2. Each NPU may include a memory, and a convolutional multiply-accumulate circuit coupled to the memory. The memory may be capable of receiving, storing and outputting input feature map (IFM) values, kernel values and output feature map (OFM) values. The N×N array of NPUs may be configured to process IFM data by: storing IFM values of an array of IFM values so that each respective row of IFM values of the array of IFM values is sequentially stored in the respective memory of NPUs located along diagonals of the N×N array of NPUs; broadcasting an IFM value stored in the memory in each NPUs located in a current diagonal to memory of other NPUs located in a same row as the NPU; for each row of the N×N array of NPUs, multiplying an IFM value broadcast to the memory of an NPU in the row by a kernel value stored in the memory of each respective NPU in the row to form a product value PV for the NPU; for each column of the N×N array of NPUs, adding all product values PV in a column to form an OFM value for the column; storing each respective output OFM value in the memory in a NPU located in the current diagonal; and repeating broadcasting, multiplying, adding and storing until all diagonals of the N×N array of NPUs have been processed. In one embodiment, each OFM value may be stored in a NPU location corresponding to an IFM value for a next layer for the OFM value. In another embodiment, N may be one of 2, 4, 8, 16, 32 and 64. In still another embodiment, the memory of each NPU may be SRAM. In one embodiment, the N rows may include rows $r_i$-$r_N$, the N columns may include columns $c_j$-$c_N$ and the N diagonals may include diagonals $d_k$-$d_N$ in which i is an integer value between 1 and N inclusive, j is an integer value between 1 and N inclusive and k is an integer value between 1 and N inclusive, and each diagonal may include N NPUs, and an $k^{th}$ diagonal $d_k$ may extend in a direction from an $j^{th}$ NPU in row $r_i$ toward an NPU in a row $r_{i+1}$ and in a column $c_{j+1}$ and wraps to a NPU in row $r_{N-i}$. In still another embodiment, storing IFM values of the array of IFM values may further include receiving IFM values x of an N×N matrix A by storing each IFM value $x_{i1}$-$x_{iN}$ in an $i^{th}$ row of the matrix A sequentially in the memory of an NPU located in an $i^{th}$ diagonal of the N×N array of NPUs, broadcasting may further include broadcasting each respective IFM value x stored in memory in an NPU in a diagonal $d_k$ to the memory in each other NPU in row $r_k$ of the N×N array of NPUs, multiplying may further include for each row $r_i$-$r_N$ of the N×N array of NPUs, multiplying an IFM value x broadcast to the memory of an NPU in the row by a kernel value stored in the memory of each respective NPU in the row to form a product value $PV_{ij}$ in which j indicates a column corresponding to the product value, adding may further include for each column $c_1$-$c_N$ of the N×N array of NPUs, adding all product values $PV_{ij}$ in a $j^{th}$ column of NPUs to form an $OFM_j$ value for each respective column of the N×N array of NPUs, and storing may further include storing each respective $OFM_j$ in the memory in a NPU located in the diagonal $d_k$. In one embodiment, N may be 4, and four pixels of IFM data may be processed using an 8-bit data path in a NPU, whereas in another embodiment two pixels of IFM data may be processed using a 4-bit data path in a NPU.

An example embodiment provides a core of NPUs that may include a group of N×N NPUs arranged in N rows $r_i$-$r_N$, N columns $c_j$-$c_N$ and N diagonals $d_k$-$d_N$, in which N is an integer greater than equal to 2, i is an integer value between 1 and N inclusive, j is an integer value between 1 and N inclusive and k is an integer value between 1 and N inclusive, each diagonal may include N NPUs in which an $k^{th}$ diagonal $d_k$ may extend in a direction from an $j^{th}$ NPU in row $r_i$ toward an NPU in a row $r_{i+1}$ and in a column $c_{j+1}$ and wrap to a NPU in row $r_{N-i}$. Each NPU may include a memory, and a convolutional multiply-accumulate circuit that may be coupled to the memory. The memory may be capable of receiving, storing and outputting IFM values, kernel values and OFM values. The group of NPUs may be configured to process IFM data by: receiving IFM values $x_{ab}$ of an N×N matrix A by storing each IFM value $x_{i1}$-$x_{iN}$ in an $i^{th}$ row of the matrix A sequentially in the memory of an NPU located in an $i^{th}$ diagonal of the group of N×N NPUs; broadcasting each respective IFM value x stored in memory in an NPU in a diagonal $d_k$ to the memory in each other NPU in row $r_k$ of the group of N×N NPUs; for each row $r_i$-$r_N$ of the group of N×N NPUs, multiplying an IFM value x broadcast to the memory of an NPU in the row by a kernel value stored in the memory of each respective NPU in the row to form a product value $PV_{ij}$ in which j indicates a column corresponding to the product value; for each column $c_1$-$c_N$ of the group of N×N NPUs, adding all product values $PV_{ij}$ in a $j^{th}$ column of NPUs to form an $OFM_j$ value for each respective column of the group of N×N NPUs; storing each respective $OFM_j$ in the memory in a NPU located in the diagonal $d_k$; and repeating broadcasting, multiplying, adding and storing until all diagonals $d_1$-$d_k$ have been processed. In one embodiment, each OFM value may be stored in a NPU location corresponding to an IFM value for a next layer for the OFM value. In another embodiment, N may be one of 2, 4, 8, 16, 32 and 64. In yet another embodiment, the memory of each NPU may include SRAM. In one embodiment, N may be 4, and four pixels of IFM data may be processed using an 8-bit data path in a NPU, whereas in another embodiment, two pixels of IFM data may be processed using a 4-bit data path in a NPU.

An example embodiment provides a method to process IFM values of a layer of a neural network in which the method may include: storing IFM values of an array of IFM values so that each respective row of IFM values of the array of IFM values is sequentially stored in the respective memory of NPUs located along diagonals of an N×N array of NPUs, the N×N array of NPUs may be arranged in N rows and N columns in which N is an integer greater than equal to 2, each NPU may include a memory, and a convolutional multiply-accumulate circuit that may be coupled to the memory, and the memory may be capable of receiving, storing and outputting input feature map IFM values, kernel values and OFM values; broadcasting an IFM value stored in the memory in each NPUs located in a current diagonal to memory of other NPUs located in a same row as the NPU; for each row of the N×N array of NPUs, multiplying an IFM value broadcast to the memory of an NPU in the row by a kernel value stored in the memory of each respective NPU in the row to form a product value PV for the NPU; for each column of the N×N array of NPUs, adding all product values PV in a column to form an OFM value for the column; storing each respective OFM value in the memory in a NPU located in the current diagonal; and repeating broadcasting, multiplying, adding and storing until all diagonals of the N×N array of NPUs have been processed. In one embodiment, each OFM value may be stored in a NPU location corresponding to an IFM value for a next layer for the OFM value. In one embodiment, N may be one of 2, 4, 8, 16, 32 and 64. In another embodiment, the memory of each NPU may include SRAM. In still another embodiment, the N rows may include rows $r_i$-$r_N$, the N columns may include columns $c_j$-$c_N$ and the N diagonals may include diagonals $d_k$-$d_N$ in which i is an integer value between 1 and N inclusive, j is an integer value between 1 and N inclusive and k is an integer value between 1 and N inclusive, each diagonal may include N NPUs, and an $k^{th}$ diagonal $d_k$ may extend in a direction from an $j^{th}$ NPU in row $r_1$ toward an NPU in a row $r_{i+1}$ and in a column $c_{j+1}$ and wraps to a NPU in row $r_{N-i}$. In still another embodiment, storing IFM values of the array of IFM values may further include receiving IFM values $x_{ab}$ of an N×N matrix A by storing each IFM value $x_{i1}$-$x_{iN}$ in an $i^{th}$ row of the matrix A sequentially in the memory of an NPU located in an $i^{th}$ diagonal of the N×N array of NPUs, broadcasting may further include broadcasting each respective IFM value x stored in memory in an NPU in a diagonal $d_k$ to the memory in each other NPU in row $r_k$ of the N×N array of NPUs, multiplying may further include for each row $r_i$-$r_N$ of the N×N array of NPUs, multiplying an IFM value x broadcast to the memory of an NPU in the row by a kernel value stored in the memory of each respective NPU in the row to form a product value $PV_{ij}$ in which j indicates a column corresponding to the product value, adding may further include for each column $c_1$-$c_N$ of the N×N array of NPUs, adding all product values $PV_{ij}$ in a $j^{th}$ column of NPUs to form an $OFM_j$ value for each respective column of the N×N array of NPUs, and storing may further include storing each respective $OFM_j$ in the memory in a NPU located in the diagonal $d_k$.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
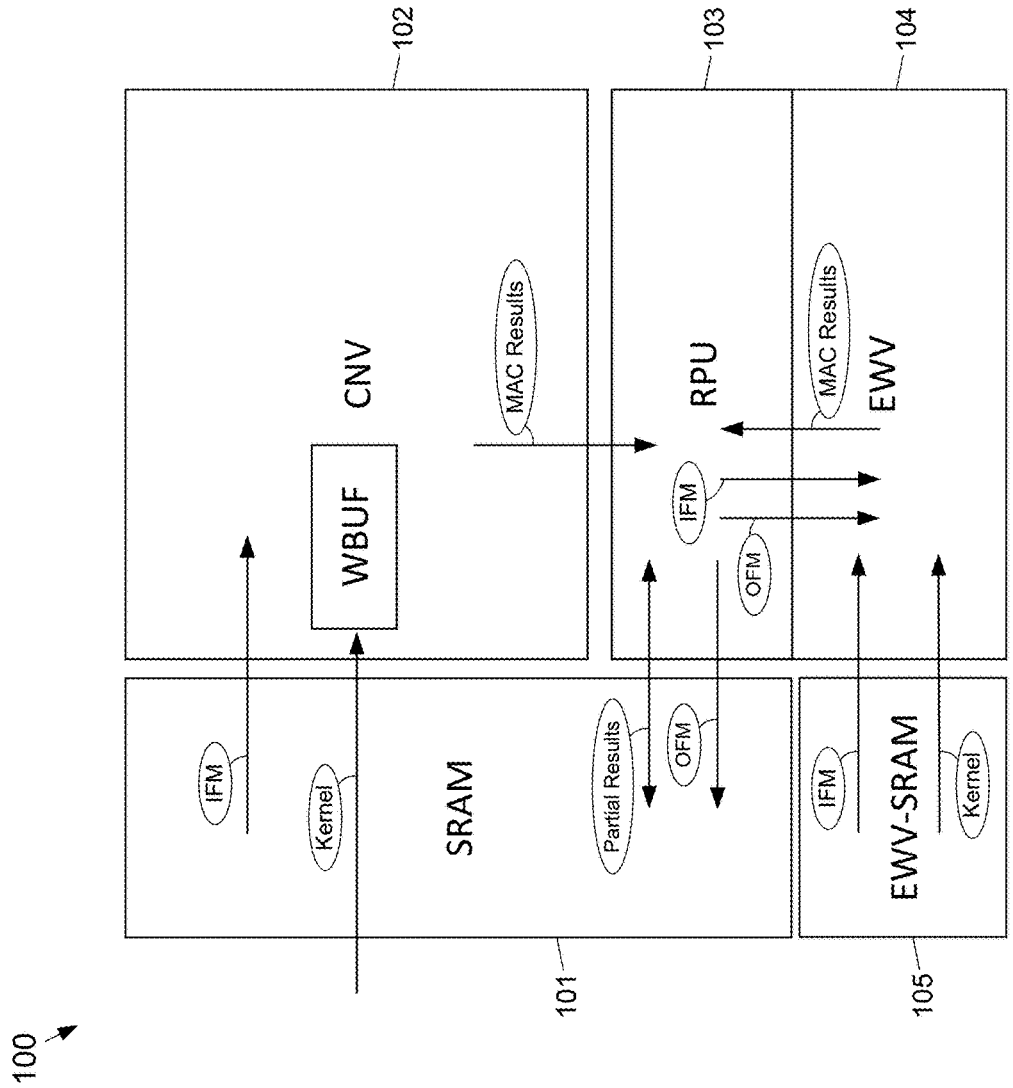
FIG. 1 depicts an example embodiment of a NPU according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary"

means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein relates to NPUs that include their own SRAM, connecting the SRAM of different NPUs to other NPUs in vertical/horizontal/diagonal directions, and using the connections to support different NPU configurations having different input-channels and output channels and having spatial-reuse of SRAM data paths.

FIG. 1 depicts an example embodiment of a NPU 100 according to the subject matter disclosed herein. As used herein, the term "NPU" may be interchangeable with the term "tile". An NPU 100 may include a SRAM 101, a convolution (CNV) multiply-accumulate (MAC) unit 102, a return-path unit (RPU) 103, an elementwise-vector (EWV) processing unit 104, and an EWV SRAM 105, shown in a functional arrangement. The various functional units of the NPU 100 may be embodied as circuits and/or as modules.

The SRAM 101 may receive Input Feature Map (IFM) data, which during operation of the NPU 100 is output to the CNV 102. In one embodiment, the CNV 102 may provide convolutional MAC functionality having 16×16×(2×1) (i.e., 16 input channels, 16 output channels, spatial unrolling of 2(cell_width)×(cell_height) cell). As used herein, (cell_width)×(cell_height) cell means that Output Feature Maps (OFMs) are divided into (cell_width)×(cell_height) in a spatial dimension. For example, in a (2×1) cell configuration, $H_o$(height)×$W_o$(width) images are split into two $H_o/2$×$W_o$ images and processed simultaneously. The CNV 102 may also include a weight buffer (WBUF) 106 that may receive kernel (weight) values. The CNV 102 performs a MAC operations (i.e., convolutional or dot-product operations) using the IFM data and the kernel values, and outputs the MAC results to the RPU 103.

The RPU 103 may transfer partial-result data and final result data for an Output Feature Map (OFM) to the SRAM 101. The RPU 103 may also transfer OFM data to the EWV 104 for further processing. The EWV unit 104 may provide elementwise-vector processing for depthwise (DW), activations, pooling and other vector operations. The EWV 104 may also receive IFM data and weight (kernel) data from the EWV SRAM 105 and may output further processed MAC result data to the RPU 103.

Figure 2A:
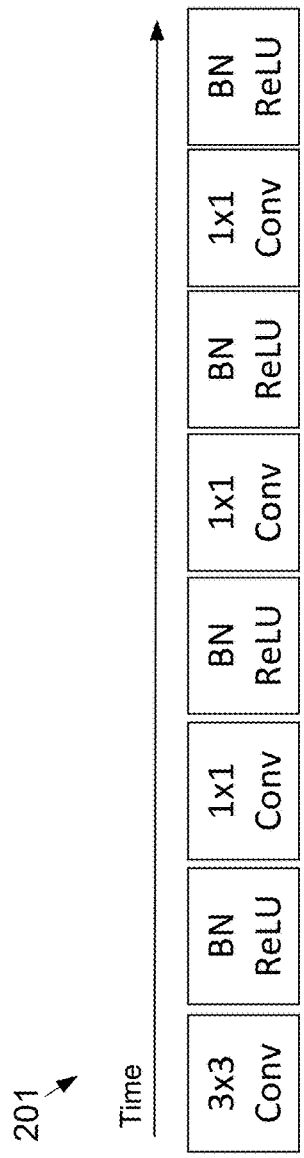
FIG. 2A depicts an example sequence of operations that may be performed using an NPU.
Figure 2B:
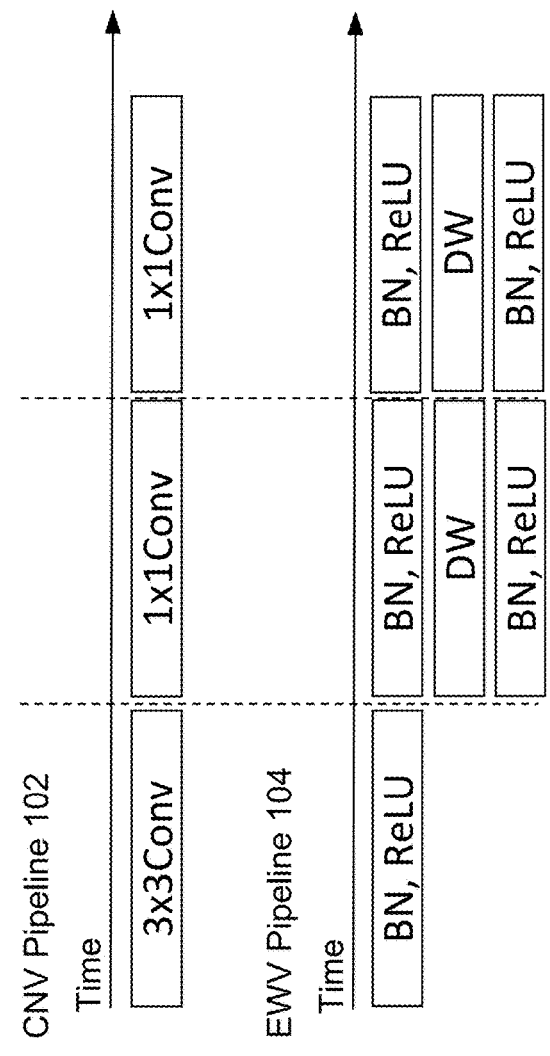
FIG. 2B depicts that the architecture of the NPU of FIG. 1 may be configured so that pipelines of a convolutional multiply-accumulate unit and an elementwise-vector processing unit may be performed in parallel.

FIG. 2A depicts an example sequence of operations 201 that may be performed using the NPU 100. When configured in a MobileNet V2 network, example operations 201 may include a convolution (Cony) operations, batch normalization (BN) and rectified linear unit (ReLU) operations. FIG. 2B depicts that the architecture of the NPU 100 may be configured so that pipelines of the CNV unit 102 and the EWV unit 104 CNV may be performed in parallel. In one embodiment, the element-wise operations of the EWV unit 104 may, for example, mask cycles of latent convolutional operations.

Figure 3:
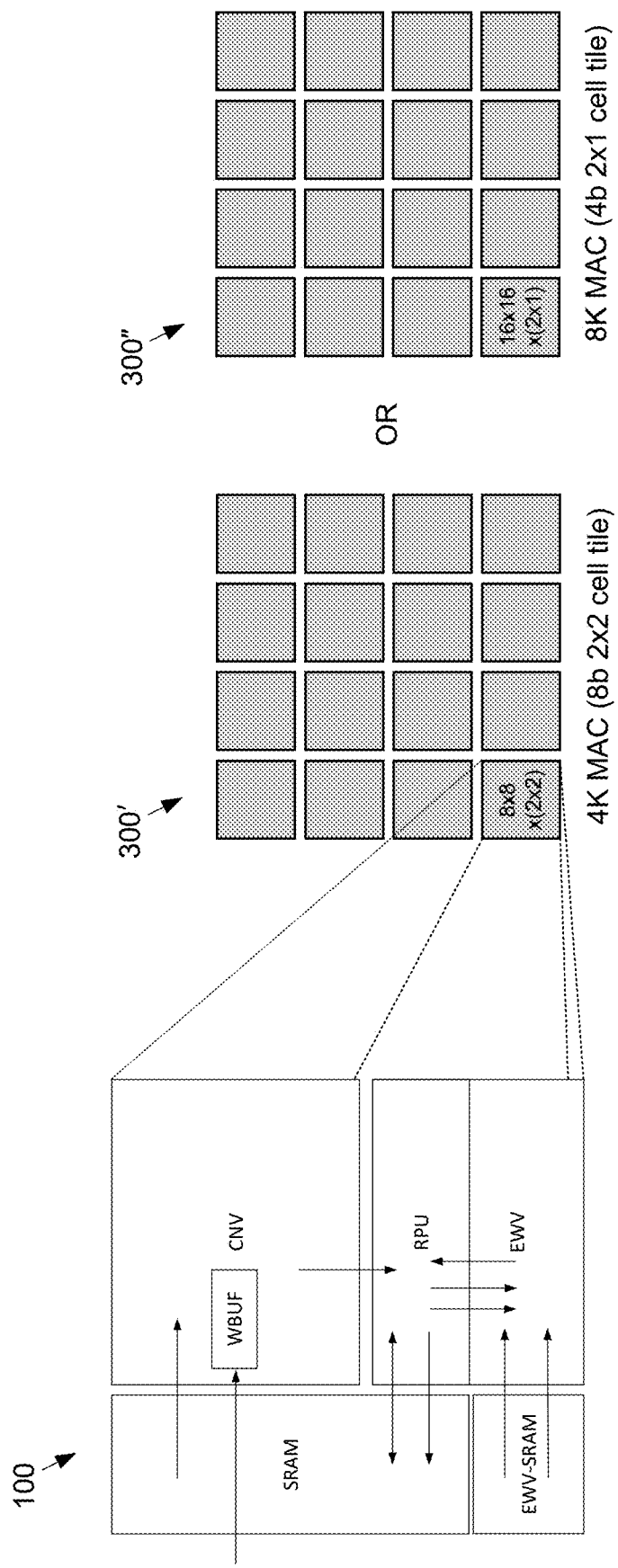
FIG. 3 depicts two example embodiments of how the NPU of FIG. 1 may be grouped to form a core according to the subject matter disclosed herein.

NPUs may be grouped to form cores. FIG. 3 depicts two example embodiments of how an NPU 100 may be grouped to form a core according to the subject matter disclosed herein. A first example core 300' may be a 4×4 tile array structure that is configured as an 4K MAC core with each tile being configured as a 4K 2×2 cell tile so that four pixels ($H_o=2$, $W_o=2$) are calculated using an 8-bit data path in a tile. A second example core 300" may be a 4×4 tile array structure that is configured as an 8K MAC (4b 2×1 cell tile) so that two pixels ($H_o=2$, $W_o=1$) are calculated using a 4-bit data path in a tile.

Each core configuration may have different rows, columns, cell widths and cell heights (rows/cols/cell_W/cell_H). If there is a remainder after division of $C_i/C_o/W_o/H_o$ by rows/cols/cell_W/cell_H (in which $C_i$ are input channels, $C_o$ are output channels, $W_o$ is cell_width, and $H_o$ is cell_height), a core may be underutilized, which may be corrected by a reconfiguration. Another reason for reconfiguring cells of a core may be because earlier layers in a neural network may have a relatively small number of channels and a relatively large number of pixels while later layers may a relatively large number of channels and a relatively small number of pixels. Still another reason for reconfiguring cells of a core may be because a high-resolution image network may benefit from more powerful multi-pixel processing than from multi-channel processing.

An 8K MAC, for example, uses 16×16×(2×1) tile as a building block in the core. The SRAM in a tile is used for IFM data, partial result data and OFM data. If there are 2(=2×1) SRAM banks having a 16B width, there is 32 GB per tile. For 16 tiles, the total SRAM bandwidth is 512 GB.

In operation, different IFM data for different OFM patches are sent to each tile. Consequently, IFM SRAM should be fully utilized because all tiles are working for different OFM with same $C_i$ and $C_o$. Kernels may be broadcast to all WBUFs, and partials results from each tile may be stored in the SRAMs in each tile. SRAM communication may likely be needed between neighboring tiles because of a halo issue.

OFM data generated at a layer in a neural network model is IFM data for the next layer of the neural network model. To improve data throughput and tile utilization, the OFM of a layer should be stored in SRAM of tiles that correspond to IFM locations of the next layer. This completely eliminates or minimizes data transfer between SRAMs and improves tile utilization.

Figure 4A:
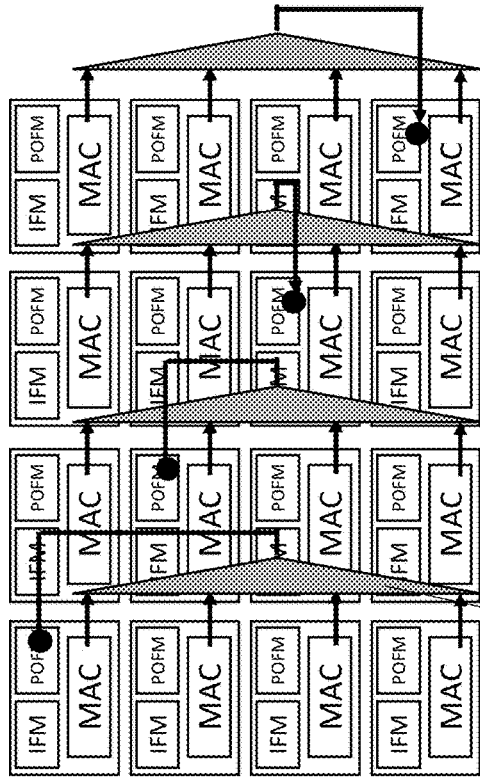
FIGS. 4A-4H depict a sequence of processing rounds provided by an example 4×4 array of reconfigurable NPUs according to the subject matter disclosed herein.

Consider an example 4×4 matrix A of IFM data for a layer, one or more example 4×4 matrices B of kernel values for the layer, and an example 4×4 core of tiles. The elements $a_{ij}$ of matrix A may be initially stored in SRAM of tiles of a core in a diagonal arrangement in the core. Referring to FIG. 4A and core 400, the first row of elements $a_{11}$-$a_{14}$ of matrix A are respectively initially stored in SRAM of tiles $T_{11}$, $T_{22}$, $T_{33}$ and $T_{44}$, in which the first subscript numeral refers to a row of a matrix or of an array of tiles, and the second subscript numeral refers to a column of a matrix or of an array of tiles. The second row of elements $a_{21}$-$a_{24}$ of matrix A are respectively initially stored in SRAM of tiles $T_{12}$, $T_{23}$, $T_{34}$ and $T_{41}$. The third row of elements $a_{31}$-$a_{34}$ of matrix A are respectively initially stored in SRAM of tiles $T_{13}$, $T_{24}$, $T_{31}$ and $T_{42}$. The fourth row of elements $a_{41}$-$a_{44}$ of matrix A are respectively initially stored in SRAM of tiles $T_{41}$, $T_{21}$, $T_{32}$ and $T_{34}$.

FIG. 4A depicts the elements $a_{11}$-$a_{14}$ of the first row of matrix A stored in SRAM (indicated by IFM) of tiles $T_{11}$, $T_{22}$, $T_{33}$ and $T_{44}$, as depicted by dark circles. The elements $b_{11}$-$b_{44}$ of (a first) matrix B are respectively stored in SRAM of a corresponding tiles $T_{11}$-$T_{44}$.

During a first round of computation, the IFM data in SRAM of tiles $T_{11}$, $T_{22}$, $T_{33}$ and $T_{44}$ are broadcast, or distributed, to each of the other tiles in the same corresponding row. That is, IFM data stored in tile $T_{11}$ are broadcast to tiles $T_{12}$, $T_{13}$ and $T_{14}$, as indicated by a horizontal line extending between tiles $T_{11}$ and $T_{14}$. Similarly, the IFM data in SRAM of the tiles in rows 2-4 are broadcast to the other tiles of the same row, as indicated in FIG. 4A.

Figure 4B:
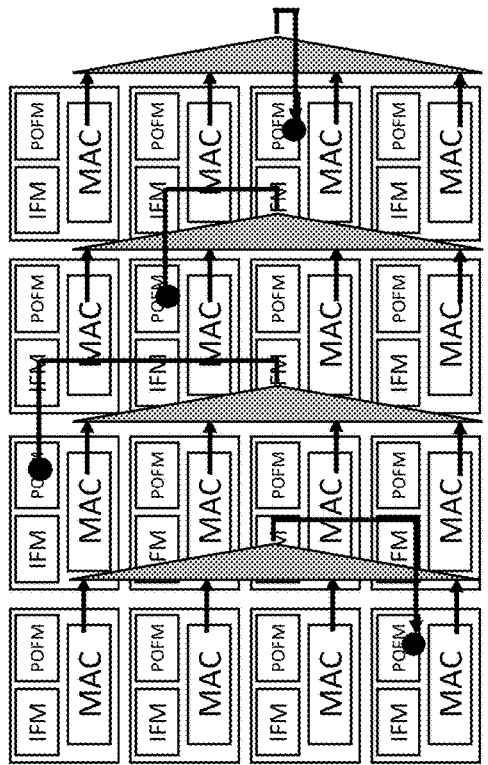

The broadcast IFM data and the kernel value of tiles in a tile column are multiplied and accumulated (MAC) and reduced by a corresponding column adder tree 401, of which only one column adder tree is indicated. Partial results are stored in POFM (Partial OFM) a diagonal manner, as indicated by the dark circles in FIG. 4B. Outputs of the column adder trees may be directed to the appropriate tile using, for example, 1-to-4 switch arrangements (not shown for clarity) or 1-to-4 multiplexers (not shown for clarity).

Figure 4C:
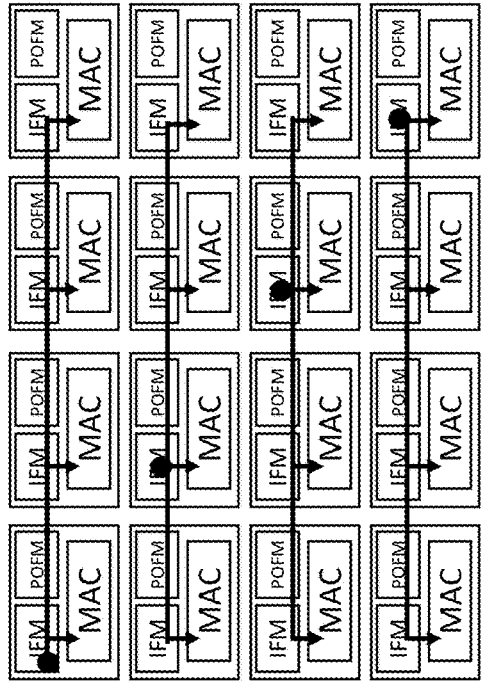
Figure 4D:
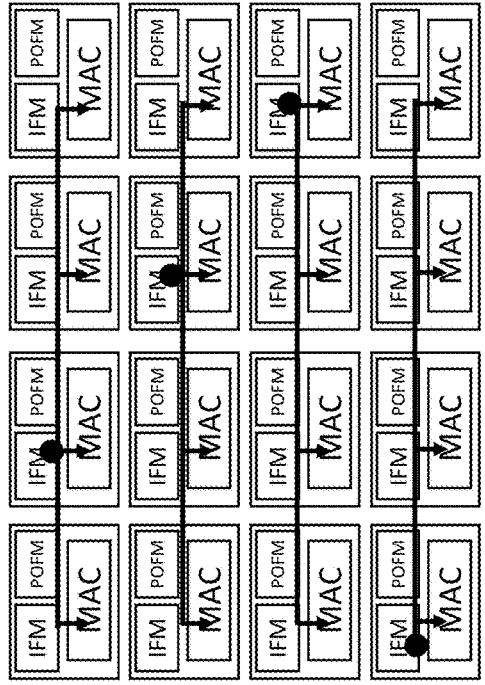

During a second round of computation, as shown by FIG. 4C, IFM data (dark circles) stored in SRAM along the tile diagonal of tiles $T_{12}$, $T_{23}$, $T_{34}$ and $T_{41}$ are broadcast (horizontal lines) to each of the other tiles in the same corresponding row. The broadcast IFM data and the kernel value of tiles in a tile column are multiplied and accumulated (MAC) and reduced by a corresponding column adder tree. Partial results are stored in a diagonal manner, as indicated by the dark circles in FIG. 4D.

Figure 4E:
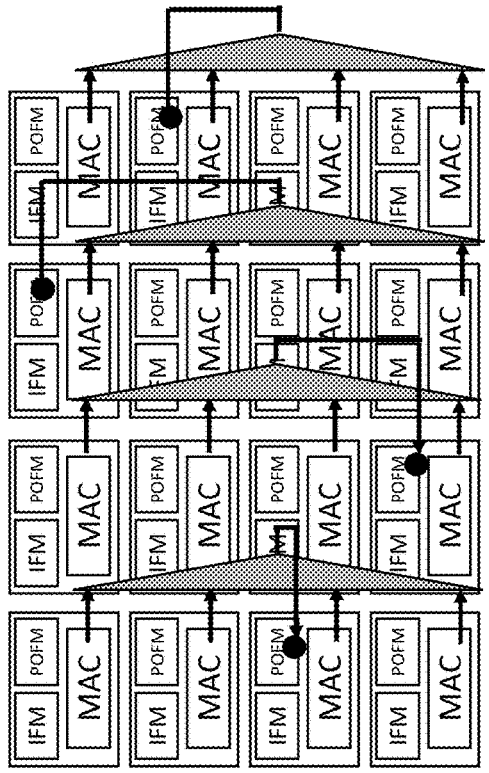

During a third round of computation, as shown by FIG. 4E, IFM data (dark circles) stored in SRAM along the tile diagonal of tiles $T_{13}$, $T_{24}$, $T_{31}$ and $T_{42}$ are broadcast (horizontal lines) to each of the other tiles in the same corresponding row. The broadcast IFM data and the kernel value of tiles in a tile column are multiplied and accumulated (MAC) and reduced by a corresponding column adder tree. Partial results are stored in a diagonal manner, as indicated by the dark circles in FIG. 4F.

Figure 4G:
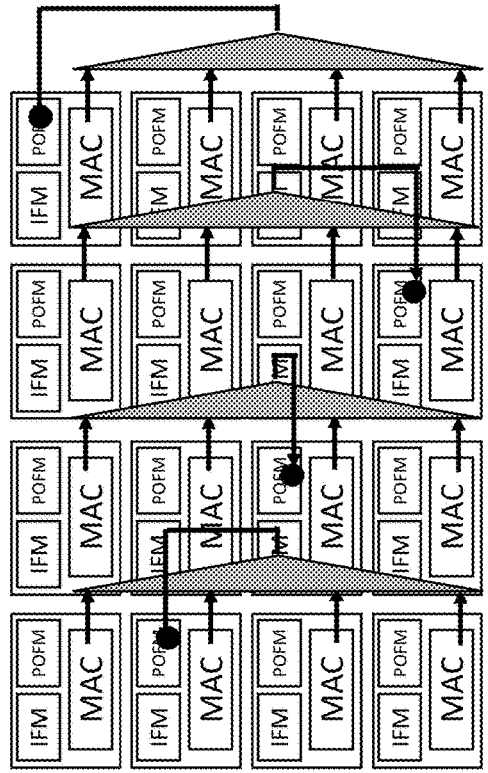
Figure 4F:
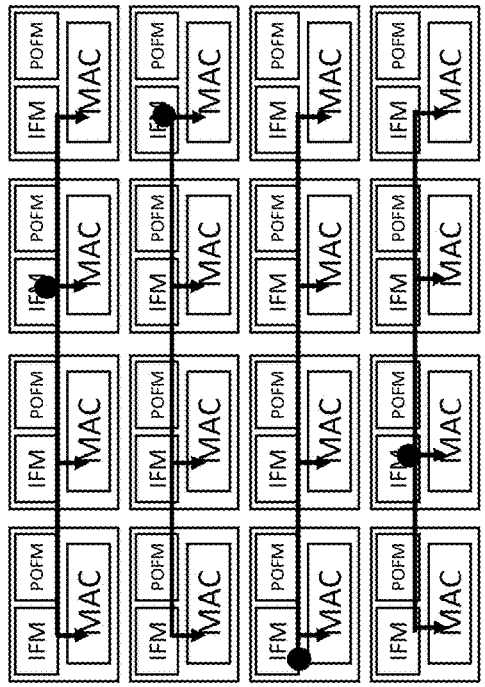
Figure 4H:
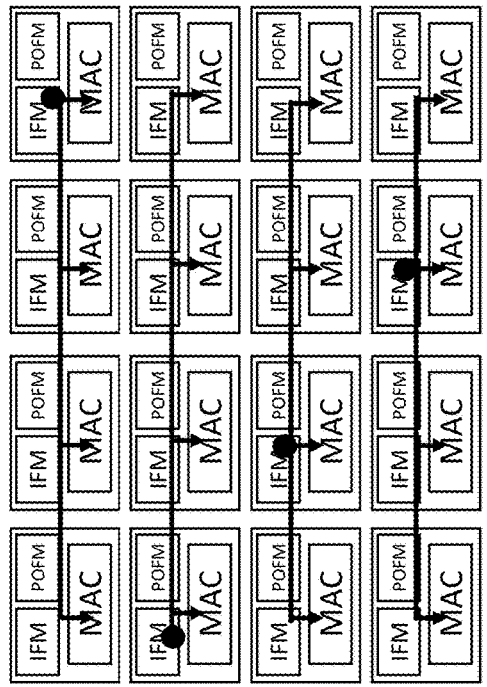

During a fourth round of computation, as shown by FIG. 4G, IFM data (dark circles) stored in SRAM along the tile diagonal of tiles $T_{14}$, $T_{21}$, $T_{32}$ and $T_{43}$ are broadcast (horizontal lines) to each of the other tiles in the same corresponding row. The broadcast IFM data and the kernel value of tiles in a tile column are multiplied and accumulated (MAC) and reduced by a corresponding column adder tree. Partial results are stored in a diagonal manner, as indicated by the dark circles in FIG. 4H.

The results stored in the SRAMs of the tiles after four rounds of computation are OFMs of the current layer, and are IFMs of the next layer. The diagonal arrangement disclosed herein provides that OFMs of a current layer in stored in a diagonal manner may be used as IFM data for a next layer without data transfer between SRAMs.

Figure 5B:
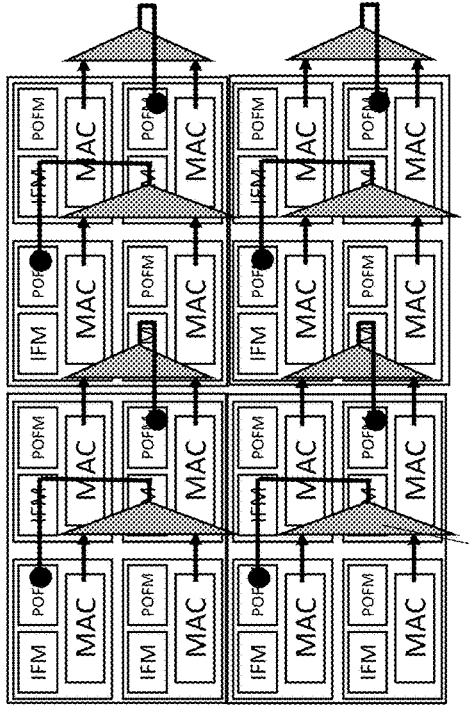
FIGS. 5A-5D depict a sequence of processing rounds provided by an example 2×2 array of reconfigurable NPUs according to the subject matter disclosed herein.
Figure 5D:
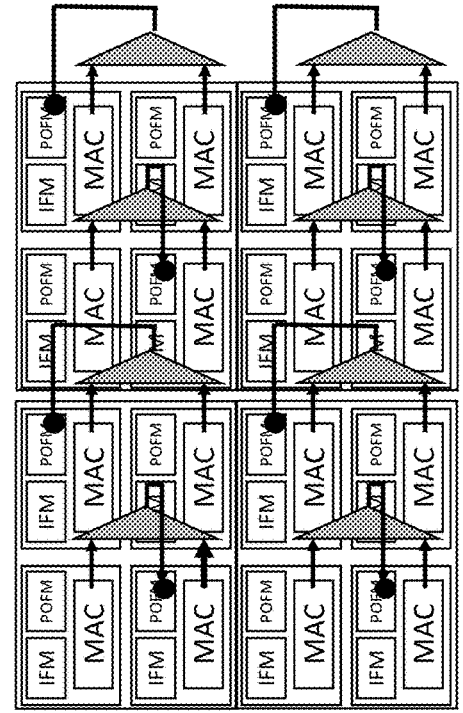
Figure 5A:
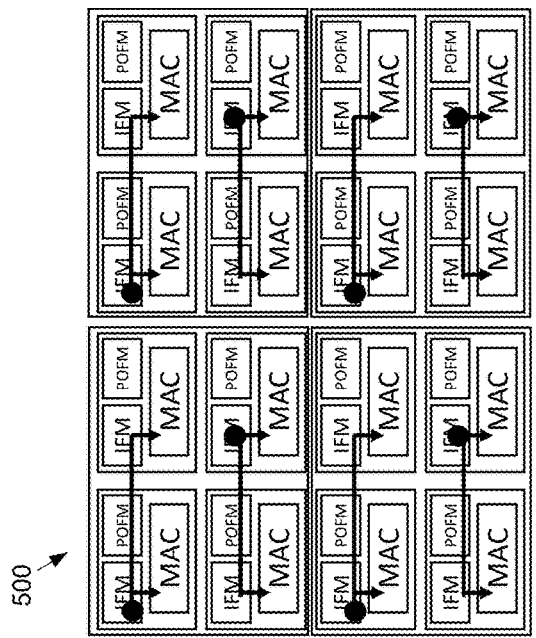

As another example, consider an example 2×2 matrix A of IFM data for a layer, one or more example 2×2 matrices B of kernel values for the layer, and an example 4×4 core of tiles. The elements $a_{ij}$ of matrix A may be initially stored in IFM SRAM of tiles of a 2×2 group of tiles of the core in a diagonal arrangement in the core. Referring to FIG. 5A and core 500, the first row of elements $a_{11}$-$a_{12}$ of matrix A are respectively initially stored in IFM SRAM of tiles $T_{11}$ and $T_{22}$, and the second row of element $a_{21}$-$a_{22}$ are respectively stored in IFM SRAM of tiles Tia and $T_{24}$. The elements $a_{ij}$ of matrix A may be similarly stored in IFM SRAM of other 2×2 groups of tiles of the core.

FIG. 5A depicts the elements $a_{11}$-$a_{12}$ of the first row of matrix A stored in SRAM (indicated by IFM) of tiles $T_{11}$ and $T_{22}$, as depicted by dark circles. The elements $b_{11}$-$b_{22}$ of (a first) matrix B are respectively stored in SRAM of a corresponding tiles $T_{11}$-$T_{22}$.

During a first round of computation, the IFM data in SRAM of tiles $T_{11}$ and $T_{22}$ are broadcast, or distributed, to each of the other tiles in the same corresponding row. That is, for each 2×2 group of tiles, IFM data stored in tile $T_{11}$ are broadcast to tile $T_{12}$, as indicated by a horizontal line extending between tiles $T_{11}$ and $T_{12}$. Similarly, the IFM data in SRAM in the tile $T_{21}$ in row 2 of each group of tiles are broadcast to the other tile of row 2, as indicated in FIG. 5A.

The broadcast IFM data and the kernel value of tiles in a tile column are multiplied and accumulated (MAC) and reduced by a corresponding column adder tree 501, of which only one column adder tree is indicated. Partial results are stored in POFM (Partial OFM) a diagonal manner, as indicated by the dark circles in FIG. 5B. Outputs of the column adder trees may be directed to the appropriate tile using, for example, 1-to-2 switch arrangements (not shown for clarity) or 1-to-2 multiplexers (not shown for clarity).

Figure 5C:
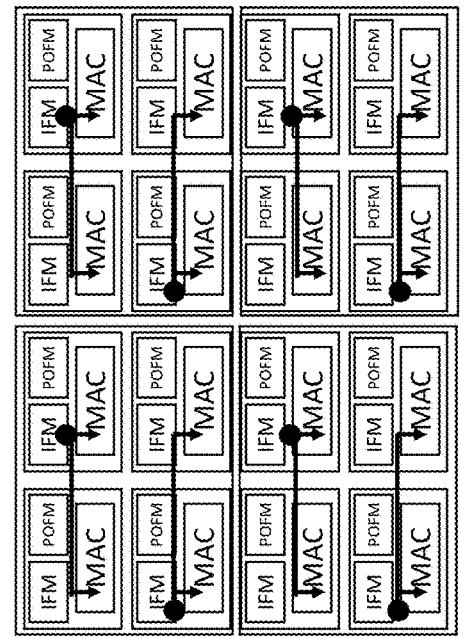

During a second round of computation, as shown by FIG. 5C, IFM data (dark circles) stored in SRAM along the tile diagonal of tiles $T_{12}$ and $T_{21}$ are broadcast (horizontal lines) to the other tile in the same row. The broadcast IFM data and the kernel value of tiles in a tile column are multiplied and accumulated (MAC) and reduced by a corresponding column adder tree. Partial results are stored in a diagonal manner, as indicated by the dark circles in FIG. 5D.

The results stored in the SRAMS of the tiles after four rounds of computation are OFMs of the current layer. The diagonal arrangement disclosed herein provides that OFMs of a current layer in diagonal tiles may be used as IFM data for a next layer without data transfer between SRAMs.

Table 1 shows utilization (%) of an example computing system for four different neural networks (without a RGB layer) for different tile configurations. In Table 1, a Util (8) means a utilization of an 8×8×(8×8) tile configuration. A Util (16) means a utilization of a 16×16×(8×4) tile configuration. A Util (32) means a utilization of a 32×32×(4×2) tile configuration, and a Util (64) means a utilization of a 64×64×(2×1) core configuration. The results shown for EfficientNet are actually results for EfficientNet-B0.

TABLE 1

| NoRGB | InceptionV3 | ResNet-50 | MobileNetV2 | EfficientNet |
|---|---|---|---|---|
| Util(8) | 66.1 | 77.8 | 81.6 | 77.2 |
| Util(16) | 74.8 | 81.5 | 79.7 | 76.7 |
| Util(32) | 85.2 | 89.5 | 77.4 | 75.0 |
| Util(64) | 70.0 | 97.2 | 45.2 | 54.5 |
| Mix1(8, 16, 32, 64) | 92.3 | 97.2 | 91.2 | 94.9 |
| Mix2(8, 16, 32) | 88.2 | 89.5 | 88.0 | 88.6 |
| Mix3(16, 32, 64) | 92.0 | 97.0 | 87.0 | 88.0 |
| Mix4(16, 32) | 88.2 | 89.5 | 84.5 | 82.6 |
| Mix5(32, 64) | 89.2 | 97.2 | 79.8 | 79.5 |

The upper four rows of Table 1 show the best/worst utilization for each of the four neural networks for the example computing system. The best utilization for each different network is for a different network configuration. An 8×8 configuration may be better for a modern network using depthwise (MobileNetV2), while 32×32 or 64×64 configuration may be better for a larger network, such as inception V3 and ResNet-50. The results suggest that it is unlikely that a single configuration provides the best utilization for a particular network.

The lower five rows in Table 1, Mix1-Mix4 configurations show an enhanced utilization based on an assumption that a core reconfiguration may occur during an inference operation of a neural network. A number of configurations have been considered because each reconfigurable option has a different corresponding interconnect/control overhead. For example, Mix1 (8,16,32,64) means that all four reconfigurations (8×8, 16×16, 32×32, 64×64) were able to be selected at each layer in a network. Mix5 (32,64) means that two configurations (32×32, 64×64) were able to be selected at each layer in a network. The most reconfigurable configuration, Mix1, appears to always provide the best utilization for all networks although Mix1 may have greater overhead than the other Mix configurations.

Reconfigurability may improve the performance (utilization) of different neural networks. That is, the reconfigurability of the NPU arrangements disclosed herein permits 8×8 arrays of NPUs, 16×16 arrays of NPUs, 32×32 arrays of NPUs and/or 64×64 arrays of NPUs. The diagonal technique for storing IFM and OFM data may be expanded to operate with 8×8 arrays of NPUs, 16×16 arrays of NPUs, 32×32 arrays of NPUs and/or 64×64 arrays of NPUs. For example, using the reconfigurability of the subject matter disclosed herein, a Mix1 (8,16,32,64) reconfigurability may be implemented providing a large saving of SRAM power/area cost.

Figure 6:
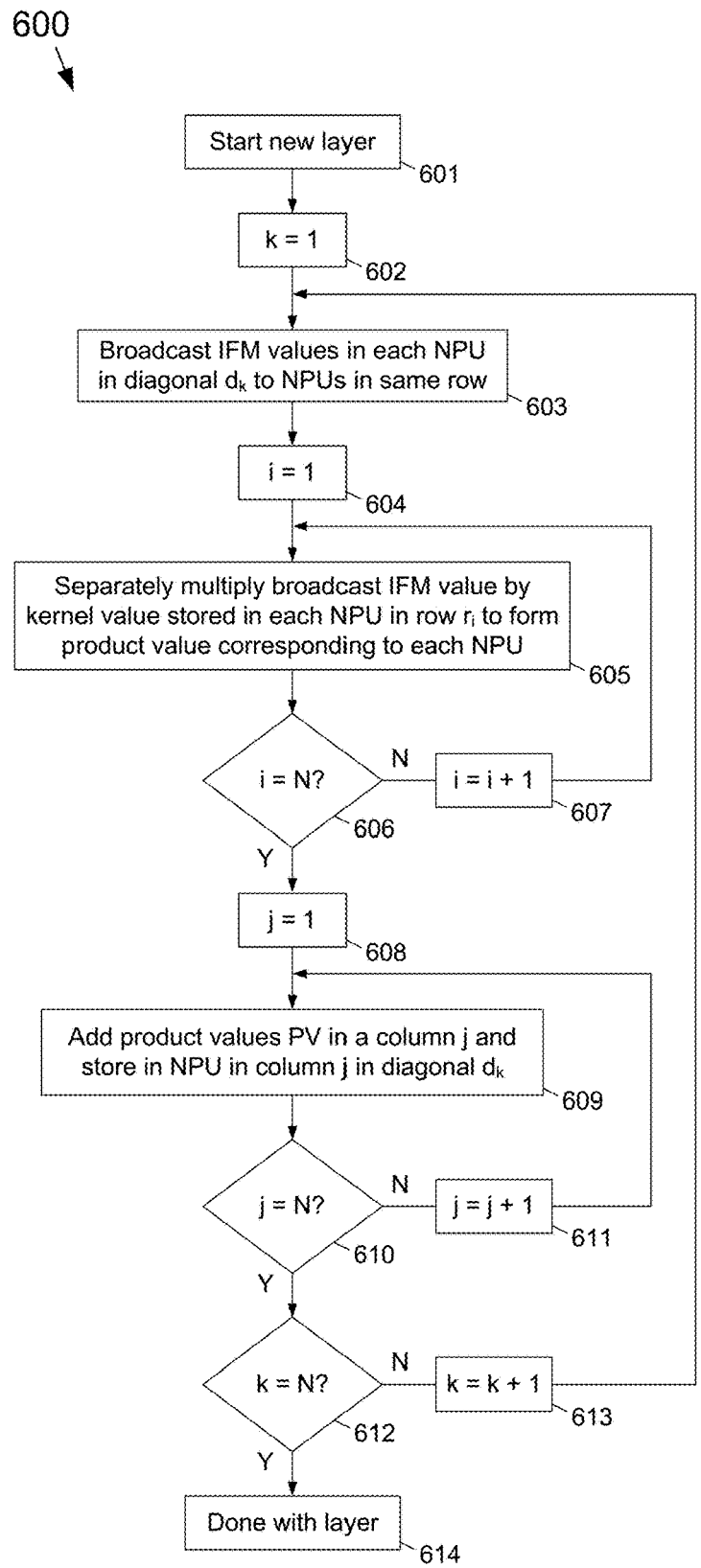
FIG. 6 is a flowchart of an example embodiment for processing input feature map data of a current layer of a neural network model and storing output feature map data of the next layer of the neural network model at a location that does not involve a data transfer between memories of the NPUs according to the subject matter disclosed herein.

FIG. 6 is a flowchart of an example embodiment 600 for processing input feature map data of a current layer of a neural network model and storing output feature map data of the next layer of the neural network model at a location that does not involve a data transfer between memories of the NPUs according to the subject matter disclosed herein. Consider an N×N core of NPUs that may include N rows $r_1$-$r_N$ of NPUs, N columns $c_1$-$c_N$ of NPUs and N diagonals $d_1$-$d_N$ of NPUs. Each diagonal $d_1$-$d_N$ may include N NPUs, and a $k^{th}$ diagonal $d_k$ extends in a direction from a $k^{th}$ NPU in row $r_k$ toward an NPU that is in row $r_{k+1}$ and is in column $c_{k+1}$, and wraps to a NPU in row $r_{N-i}$ to include N NPUs.

Before processing of a layer begins, IFM values and kernel values are input to the core of N×N NPUs as follows. For an A×B matrix X of IFM values $x_{i1}$-$x_{iB}$, in which A≤N and B≤N, each IFM value $x_{i1}$-$x_{iB}$ in an $i^{th}$ row of the matrix X is sequentially stored in the SRAM of a corresponding NPU in an $i^{th}$ diagonal of the N×N core of NPU. For a B×A matrix Y of kernel values $y_{ba}$ that are to be applied to the IFM values of matrix X, each kernel value $y_{i1}$-$y_{iA}$ in an $i^{th}$ row of the matrix Y is sequentially stored in the SRAM of a corresponding NPU in the $i^{th}$ row of the N×N core of NPUs.

Processing of a new layer of a neural network begins at 601. At 602, a diagonal processing index k is initialized to 1. At 603, each respective IFM value x stored in the SRAM of an NPU in the diagonal $d_k$ is broadcast to the SRAM of each other NPU in row $r_k$.

At 604, a row processing index i is initialized to 1. At 605, the IFM value broadcast to each NPU of row i is separately multiplied by the kernel value stored in the SRAM of the NPU to form a product value PV corresponding to the NPU. At 606, it is determined whether i=N. If not, flow continues to 607, where i is incremented and flow returns to 605 to form product values for each of the NPUs in the next row.

If, at 606, it is determined that i=N, flow continues to 608 where a column processing index j is initialized. At 609, the product column PVs in a column are added to form a column value $CV_j$, which is stored in the SRAM of the NPU in column j in diagonal k. Flow continues to 610, where it is determined whether j=N. If not, flow continues to 611 where j is incremented and flow returns to 609 to form a column value CV for the next column, which is then stored in the SRAM of the NPU in that column in diagonal k as an OFM value.

If, at 610, it is determined that j=N, flow continues to 612 where it is determined whether the diagonal processing index k=N. If so, flow continues to 613 where the diagonal processing index is incremented and flow returns to 603 to process the next diagonal d. If, at 612, it is determined that k=N, processing of this layer by the N×N core of NPUs is complete. The OFM values, which have been stored in a diagonal manner, are ready to be processed as IFM values for the next layer without data transfer between SRAMs.

Figure 7:
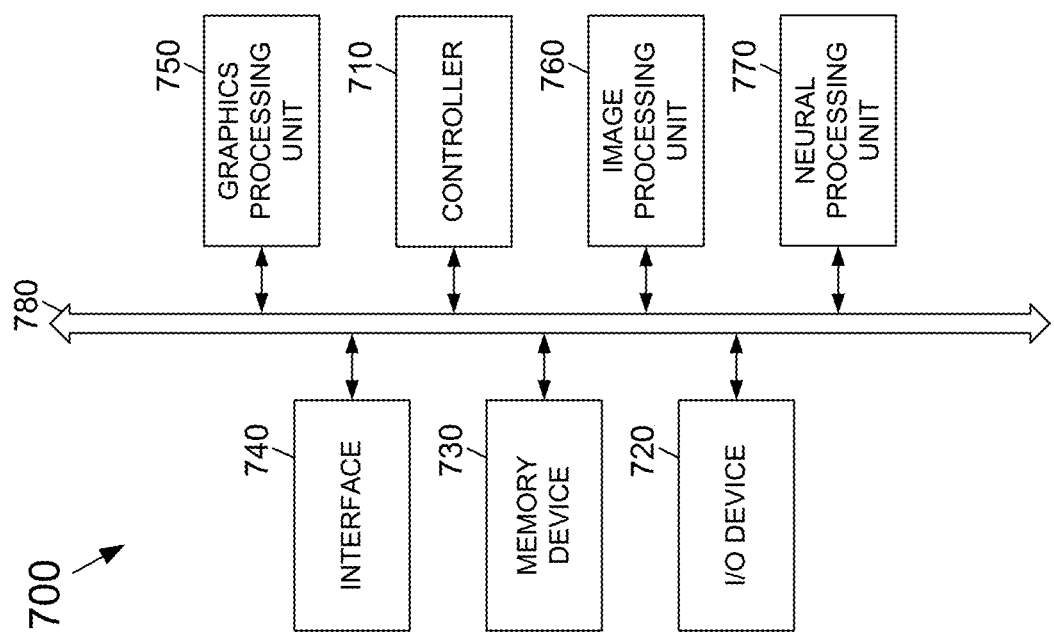
FIG. 7 depicts an electronic device that includes an array of NPUs that may process input feature map data of a current layer of a neural network model and store output feature map data of the next layer of the neural network model at a location that does not involve a data transfer between memories of the NPUs according to the subject matter disclosed herein.

FIG. 7 depicts an electronic device 700 that includes an array of NPUs that may process input feature map data of a current layer of a neural network model and store output feature map data of the next layer of the neural network model at a location that does not involve a data transfer between memories of the NPUs according to the subject matter disclosed herein. The electronic device 700 may include a controller (or CPU) 710, an input/output device 720 such as, but not limited to, a keypad, a keyboard, a display, a touch-screen display, a camera, and/or an image sensor, a memory 730, an interface 740, a GPU 750, an imaging-processing unit 760, and a neural processing unit 770 that are coupled to each other through a bus 780. The controller 710 may include, for example, at least one microprocessor, at least one digital signal processor, at least one microcontroller, or the like. The memory 730 may be configured to store a command code to be used by the controller 710 or a user data. Electronic device 700 and the various system components of electronic device 700 may be formed by one or more modules.

In one embodiment, the neural processing unit 770 may include an array of NPUs that may process input feature map data of a current layer of a neural network model and store output feature map data of the next layer of the neural network model at a location that does not involve a data transfer between memories of the NPUs according to the subject matter disclosed herein. The interface 940 may be configured to include a wireless interface that is configured to transmit data to or receive data from a wireless communication network using a RF signal. The wireless interface 940 may include, for example, an antenna. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A core of neural processing units (NPUs), comprising:
an N×N array of NPUs arranged in N rows and N columns in which N is an integer between 2 and 64 inclusive, each NPU comprising a memory, and a convolutional multiply-accumulate (MAC) circuit coupled to the memory, the memory capable of receiving, storing and outputting input feature map (IFM) values, kernel values and output feature map (OFM) values,
the N×N array of NPUs being configured to process IFM data by:
storing IFM values of an array of IFM values so that each respective row of IFM values of the array of IFM values is sequentially stored in the respective memory of NPUs located along diagonals of the N×N array of NPUs;
broadcasting an IFM value stored in the memory in each of the NPUs located along the diagonals of the N×N array of NPUs to memory of other NPUs located in a same row as the respective NPUs;
for each row of the N×N array of NPUs, multiplying an IFM value broadcast to the memory of an NPU in the row by a kernel value stored in the memory of each respective NPU in the row to form a product value PV for the NPU;
for each column of the N×N array of NPUs, adding all product values PV in a column to form an OFM value for the column;
storing each respective OFM value in the memory in a NPU located along the diagonals of the N×N array of NPUs; and
repeating broadcasting, multiplying, adding and storing until all diagonals of the N×N array of NPUs have been processed.

2. The core of NPUs of claim 1, wherein each OFM value is stored in a NPU location corresponding to an IFM value for a next layer for the OFM value.

3. The core of NPUs of claim 1, wherein the memory of each NPU comprises static random access memory (SRAM).

4. The core of NPUs of claim 1, wherein the N rows comprise rows $r_i$-$r_N$, the N columns comprise columns $c_j$-$C_N$ and the N diagonals comprise diagonals $d_k$-$d_N$, in which i is an integer value between 1 and N inclusive, j is an integer value between 1 and N inclusive and k is an integer value between 1 and N inclusive,
wherein each diagonal comprises N NPUs, and an $k^{th}$ diagonal $d_k$ extends in a direction from an $j^{th}$ NPU in row $r_i$ toward an NPU in a row $r_{i+1}$ and in a column $c_{j+1}$ and wraps to a NPU in row $r_{N-i}$.

5. The core of NPUs of claim 4, wherein storing IFM values of the array of IFM values further comprises receiving IFM values x of an N×N matrix A by storing each IFM value $X_{i1}$-$X_{iN}$ in an $i^{th}$ row of the matrix A sequentially in the memory of an NPU located in an $i^{th}$ diagonal of the N×N array of NPUs,
wherein broadcasting further comprises broadcasting each respective IFM value x stored in memory in an NPU in a diagonal $d_k$ to the memory in each other NPU in row $r_k$ of the N×N array of NPUs,
wherein multiplying further comprises for each row $r_i$-$r_n$ of the N×N array of NPUs, multiplying an IFM value x broadcast to the memory of an NPU in the row by a kernel value stored in the memory of each respective NPU in the row to form a product value $PV_{ij}$ in which j indicates a column corresponding to the product value,
wherein adding further comprises for each column $c_1$-$C_N$ of the N×N array of NPUs, adding all product values $PV_{ij}$ in a $j^{th}$ column of NPUs to form an OFM; value for each respective column of the N×N array of NPUs, and
wherein storing further comprises storing each respective $OFM_j$ in the memory in a NPU located in the diagonal $d_k$.

6. The core of NPUs of claim 1, wherein N comprises 4, and
wherein four pixels of IFM data are processed using an 8 bit data path in a NPU.

7. The core of NPUs of claim 1, wherein N comprises 4, and
wherein two pixels of IFM data are processed using a 4 bit data path in a NPU.

8. A core of neural processing units (NPUs), comprising:
a group of N×N NPUs arranged in N rows $r_i$-$r_N$, N columns $c_j$-$C_N$ and N diagonals $d_k$-$d_N$, in which N is an integer between 2 and 64 inclusive, i is an integer value between 1 and N inclusive, j is an integer value between 1 and N inclusive and k is an integer value between 1 and N inclusive, each diagonal comprising N NPUs, an $k^{th}$ diagonal $d_k$ extending in a direction from an $j^{th}$ NPU in row $r_i$ toward an NPU in a row $r_{i+1}$ and in a column $c_{j+1}$ and wrapping to a NPU in row $I_{N-i}$, each NPU comprising a memory, and a convolutional multiply-accumulate (MAC) circuit coupled to the memory, the memory capable of receiving, storing and outputting input feature map (IFM) values, kernel values and output feature map (OFM) values,
the group of NPUs being configured to process IFM data by:
receiving IFM values $X_{ab}$ of an N×N matrix A by storing each IFM value $X_{i1}$-$X_{in}$ in an $i^{th}$ row of the matrix A sequentially in the memory of an NPU located in an $i^{th}$ diagonal of the group of N×N NPUs;
broadcasting each respective IFM value x stored in memory in an NPU in a diagonal $d_k$ to the memory in each other NPU in row $r_k$ of the group of N×N NPUs;
for each row $r_i$-$I_N$ of the group of N×N NPUs, multiplying an IFM value x broadcast to the memory of an NPU in the row by a kernel value stored in the memory of each respective NPU in the row to form a product value $PV_{ij}$ in which j indicates a column corresponding to the product value;
for each column $c_1$-$C_N$ of the group of N×N NPUs, adding all product values $PV_{ij}$ in a $j^{th}$ column of NPUs to form an $OFM_j$ value for each respective column of the group of N×N NPUs;
storing each respective $OFM_j$ in the memory in a NPU located in the diagonal $d_k$; and
repeating broadcasting, multiplying, adding and storing until all diagonals $d_1$-$d_k$ have been processed.

9. The core of NPUs of claim 8, wherein each OFM value is stored in a NPU location corresponding to an IFM value for a next layer for the OFM value.

10. The core of NPUs of claim 8, wherein the memory of each NPU comprises static random access memory (SRAM).

11. The core of NPUs of claim 8, wherein N comprises 4, and
wherein four pixels of IFM data are processed using an 8 bit data path in a NPU.

12. The core of NPUs of claim 8, wherein N comprises 4, and
wherein two pixels of IFM data are processed using a 4 bit data path in a NPU.

13. A method to process input feature map (IFM) values of a layer of a neural network, the method comprising:
storing IFM values of an array of IFM values so that each respective row of IFM values of the array of IFM values is sequentially stored in the respective memory of NPUs located along diagonals of an N×N array of NPUs, the N×N array of NPUs being arranged in N rows and N columns in which N is an integer between 2 and 64 inclusive, each NPU comprising a memory, and a convolutional multiply-accumulate (MAC) circuit coupled to the memory, the memory capable of receiving, storing and outputting input feature map (IFM) values, kernel values and output feature map (OFM) values;
broadcasting an IFM value stored in the memory in each of the NPUs located along the diagonals of the N×N array of NPUs to memory of other NPUs located in a same row as the respective NPUs;
for each row of the N×N array of NPUs, multiplying an IFM value broadcast to the memory of an NPU in the row by a kernel value stored in the memory of each respective NPU in the row to form a product value PV for the NPU;
for each column of the N×N array of NPUs, adding all product values PV in a column to form an OFM value for the column;
storing each respective OFM value in the memory in a NPU located along the diagonals of the N×N array of NPUs; and
repeating broadcasting, multiplying, adding and storing until all diagonals of the N×N array of NPUs have been processed.

14. The method of claim 13, wherein each OFM value is stored in a NPU location corresponding to an IFM value for a next layer for the OFM value.

15. The method of claim 13, wherein the memory of each NPU comprises static random access memory (SRAM).

16. The method of claim 13, wherein the N rows comprise rows $r_i$-$I_N$, the N columns comprise columns $c_j$-$C_N$ and the N diagonals comprise diagonals $d_k$-$d_N$, in which i is an integer value between 1 and N inclusive, j is an integer value between 1 and N inclusive and k is an integer value between 1 and N inclusive,
wherein each diagonal comprises N NPUs, and an $k^{th}$ diagonal $d_k$ extends in a direction from an $j^{th}$ NPU in row $r_i$ toward an NPU in a row $r_{i+1}$ and in a column $c_{j+1}$ and wraps to a NPU in row $r_{N-i}$.

17. The method of claim 16, wherein storing IFM values of the array of IFM values further comprises receiving IFM values $X_{ab}$ of an N×N matrix A by storing each IFM value $X_{i1}$-$X_{iN}$ in an $i^{th}$ row of the matrix A sequentially in the memory of an NPU located in an $i^{th}$ diagonal of the N×N array of NPUs,
wherein broadcasting further comprises broadcasting each respective IFM value x stored in memory in an NPU in a diagonal $d_k$ to the memory in each other NPU in row $r_k$ of the N×N array of NPUs,
wherein multiplying further comprises for each row $r_i$-$r_n$ of the N×N array of NPUs, multiplying an IFM value x broadcast to the memory of an NPU in the row by a kernel value stored in the memory of each respective NPU in the row to form a product value $PV_{ij}$ in which j indicates a column corresponding to the product value,
wherein adding further comprises for each column $c_1$-$C_N$ of the N×N array of NPUs, adding all product values $PV_{ij}$ in a $j^{th}$ column of NPUs to form an $OFM_j$ value for each respective column of the N×N array of NPUs, and
wherein storing further comprises storing each respective $OFM_j$ in the memory in a NPU located in the diagonal $d_k$.

\* \* \* \* \*